(12) United States Patent
Zhang

(10) Patent No.: US 10,601,742 B2
(45) Date of Patent: Mar. 24, 2020

(54) APPARATUS, SYSTEMS, AND METHODS FOR NETWORK INTERACTIONS

(71) Applicant: Tencent Technology (Shenzhen) Company Limited, Shenzhen (CN)

(72) Inventor: Xiaolong Zhang, Shenzhen (CN)

(73) Assignee: TENCENT TECHNOLOGY (SHENZHEN) CO., LTD. (CN)

( * ) Notice: Subject to any disclaimer, the term of this patent is extended or adjusted under 35 U.S.C. 154(b) by 155 days.

(21) Appl. No.: 15/695,896

(22) Filed: Sep. 5, 2017

(65) Prior Publication Data

US 2017/0366487 A1   Dec. 21, 2017

Related U.S. Application Data

(63) Continuation of application No. 14/290,685, filed on May 29, 2014, now Pat. No. 9,787,615, which is a
(Continued)

(30) Foreign Application Priority Data

Apr. 27, 2013   (CN) .......................... 2013 1 0153043

(51) Int. Cl.
    *G06F 15/16*      (2006.01)
    *H04L 12/58*      (2006.01)
    *H04L 12/18*      (2006.01)

(52) U.S. Cl.
    CPC .......... *H04L 51/04* (2013.01); *H04L 12/1859* (2013.01)

(58) Field of Classification Search
    CPC ............................ H04L 51/04; H04L 12/1859
    (Continued)

(56) References Cited

U.S. PATENT DOCUMENTS

2007/0143502 A1   6/2007   Garcia-Martin et al.
2008/0046369 A1   2/2008   Wood
(Continued)

FOREIGN PATENT DOCUMENTS

AR      096079 A1   12/2015
CN     1798032 A    7/2006
(Continued)

OTHER PUBLICATIONS

International Search Report dated Mar. 13, 2014 in International Application No. PCT/CN2013/088152.
(Continued)

*Primary Examiner* — Wing F Chan
*Assistant Examiner* — Joseph R Maniwang
(74) *Attorney, Agent, or Firm* — Brinks Gilson & Lione

(57) ABSTRACT

A network interaction system may comprise a terminal device, an instant messaging server, and a public account server. The terminal device may be configured to receive information from the public account server via the instant messaging server. The instant messaging server may be configured to receive from the terminal device an information operation request associated with information from the public account server. Then the instant messaging server may send a notification associated with the information operation request to the public account server and send a response to the information operation request to the terminal device. The public account server may be configured to receive from the instant messaging server the notification and determine an information transmission strategy for the terminal device in accordance with the information operation request.

17 Claims, 6 Drawing Sheets

Figure 3

Related U.S. Application Data continuation of application No. PCT/CN2013/088152, filed on Nov. 29, 2013.

(58) Field of Classification Search
USPC .......................................................... 709/206
See application file for complete search history.

(56) References Cited

U.S. PATENT DOCUMENTS

| | | | |
|---|---|---|---|
| 2008/0082941 A1 | 4/2008 | Goldberg et al. | |
| 2008/0155112 A1 | 6/2008 | Ma et al. | |
| 2008/0163318 A1* | 7/2008 | Chen ...................... | H04N 7/165 725/109 |
| 2009/0089380 A1 | 4/2009 | Wang et al. | |
| 2009/0177741 A1* | 7/2009 | Tian ...................... | H04L 63/102 709/203 |
| 2014/0310358 A1* | 10/2014 | Pignataro .............. | H04L 51/046 709/206 |
| 2018/0332064 A1* | 11/2018 | Harris .................... | G06F 15/16 |

FOREIGN PATENT DOCUMENTS

| | | |
|---|---|---|
| CN | 101087474 A | 12/2007 |
| CN | 101188625 A | 5/2008 |
| CN | 102546554 A | 7/2012 |
| CN | 104125134 B | 4/2016 |

OTHER PUBLICATIONS

Written Opinion dated Mar. 13, 2014 in International Application No. PCT/CN2013/088152.
Office Action dated Apr. 29, 2015 for Chinese Application No. 201310153043.9, 9 pages.
Office Action dated Mar. 2, 2015, in Chinese Patent Application No. 201310271864.2 (10 pages).
Office Action dated Feb. 12, 2019 for Argentinian Application No. 20140101700, 3 pages.

\* cited by examiner

APPARATUS, SYSTEMS, AND METHODS FOR NETWORK INTERACTIONS

PRIORITY STATEMENT

This application is a continuation of U.S. application Ser. No. 14/290,685 filed on May 29, 2014, which is a continuation of International Application No. PCT/CN2013/088152, filed on Nov. 29, 2013, which claims priority to Chinese Patent Application No. 201310153043.9 filed on Apr. 27, 2013, all of which are hereby incorporated herein by reference in their entireties.

FIELD

The present disclosure relates to Internet technologies. Specifically, the present disclosure relates to methods, apparatus, and systems for network interactions.

BACKGROUND

Along with the constantly enriched functions of mobile phones, a user may use account information to log into an instant messaging server from a mobile phone, and make use of a scanning plug-in provided by the instant messaging server to scan a two-dimensional code of a public account server (such as 36Kr.com). If the two-dimensional code of the public account server has been successfully scanned and verified, then the user may choose to follow news, instruction, and/or information provided from this public account server via the instant messaging server. In this way, after this public account server has sent the news, instruction, and/or information to the instant messaging server, the instant messaging server may release the information to the user.

However, in practice, in the public account server side, the public account server does not know whether the news, instruction, and/or information has been subscribed or unsubscribed. It is a waste of resources from the public account server if the public account server has not been subscribed but it transmits and/or sends the news, instruction, and/or information to the instant messaging server.

SUMMARY

According to an aspect of the present disclosure, a method for network interaction by an instant messaging server may comprise receiving, by the instant messaging server, from a terminal device an information operation request associated with information from a public account server; sending, by the instant messaging server, a notification associated with the information operation request to the public account server; and sending, by the instant messaging server, a response to the information operation request to the terminal device. The public account server may be configured to send the information to the terminal device via the instant messaging server, and the notification may be configured to render the public account server to determine an information transmission strategy for the terminal device in accordance with the information operation request.

According to an aspect of the present disclosure, an instant messaging server may comprise at least one processor-readable non-transitory storage medium comprising a set of instructions for network interaction; and at least one processor in communication with the processor-readable non-transitory storage medium and configured to execute the set of instructions to receive from a terminal device an information operation request associated with information from a public account server; send a notification associated with the information operation request to the public account server; and send a response to the information operation request to the terminal device. The public account server may be configured to send the information to the terminal device via the instant messaging server, and the notification may be configured to render the public account server to determine an information transmission strategy for the terminal device in accordance with the information operation request.

According to an aspect of the present disclosure, a network interaction system may comprise a terminal device, an instant messaging server, and a public account server. The terminal device may be configured to receive information from the public account server via the instant messaging server. The instant messaging server may be configured to receive from the terminal device an information operation request associated with the information from the public account server; send a notification associated with the information operation request to the public account server; and send a response to the information operation request to the terminal device. The public account server may be configured to receive from the instant messaging server the notification; and determine an information transmission strategy for the terminal device in accordance with the information operation request.

BRIEF DESCRIPTION OF THE DRAWINGS

The above and other features and advantages will become more apparent by describing in detail example embodiments thereof with reference to the attached drawings in which.

Figure 1:
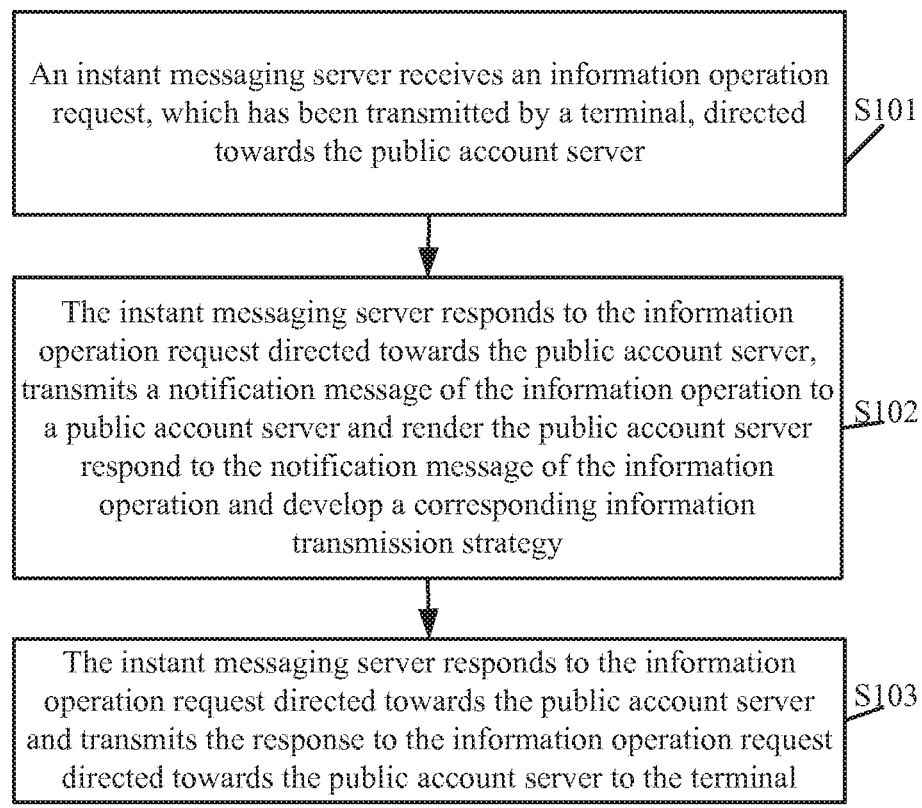
FIG. 1 is a flow diagram illustrating a network interaction method according to example embodiments of the present disclosure.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION OF EXAMPLE EMBODIMENTS

Figure 5:
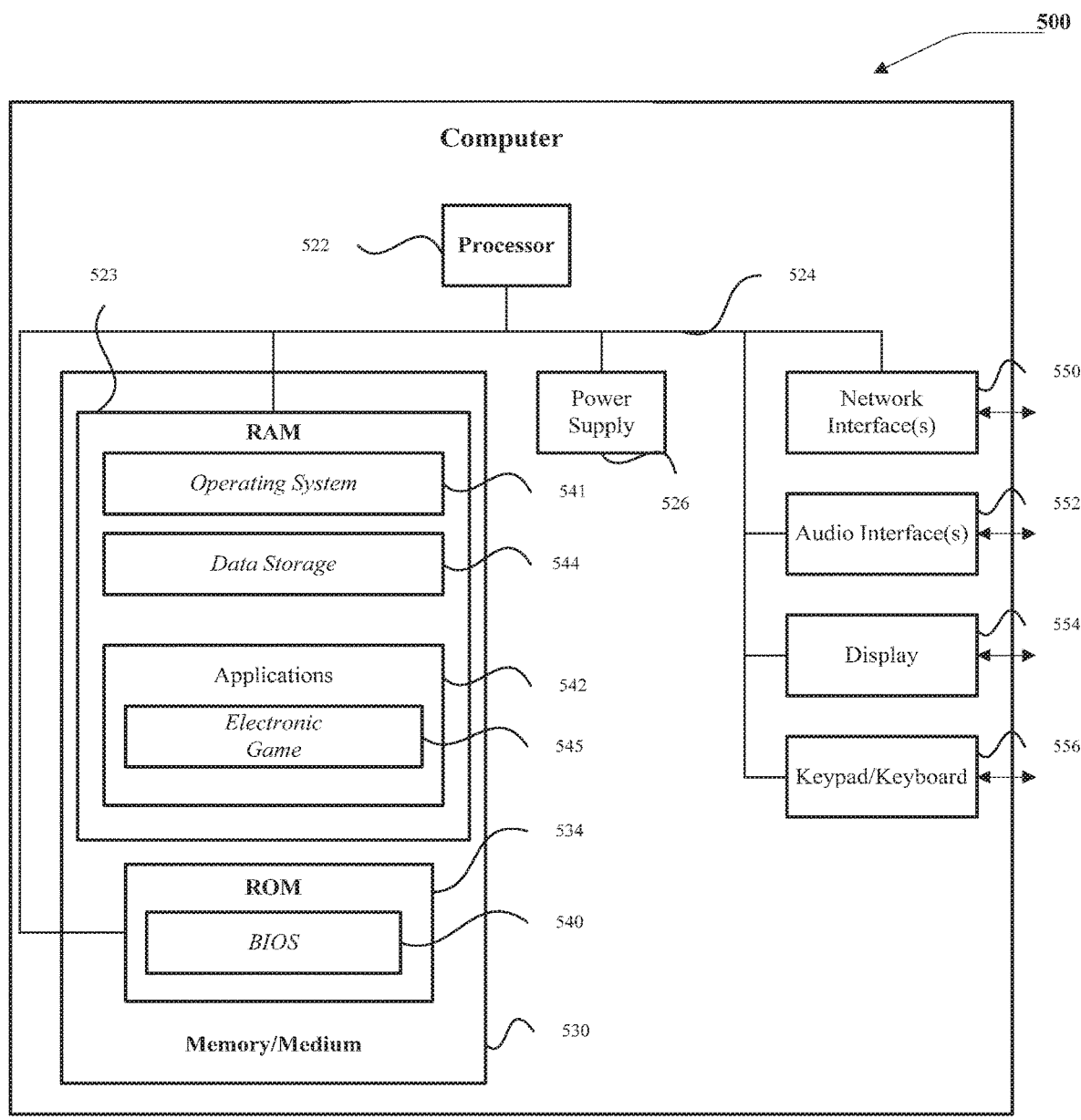
FIG. 5 is a schematic diagram illustrating an example embodiment of a client device that may be a terminal in the present disclosure.

FIG. 5 is a schematic diagram illustrating an example embodiment of a client device that may be a terminal (e.g., a mobile communication device or a computer device) as introduced in the present disclosure. The client device may comprise apparatuses to execute methods and software systems introduced in the present disclosure. A client device 500 may be a computing device capable of executing a software system. The client device 500 may, for example, be a device such as a personal desktop computer or a portable device, such as a laptop computer, a tablet computer, a cellular telephone, or a smart phone.

The client device 500 may vary in terms of capabilities or features. Claimed subject matter is intended to cover a wide range of potential variations. For example, the client device 500 may comprise a keypad/keyboard 556. It may also comprise a display 554, such as a liquid crystal display (LCD), or a display with a high degree of functionality, such as a touch-sensitive color 2D or 3D display. In contrast, however, as another example, a web-enabled client device 500 may comprise one or more physical or virtual keyboards, and mass storage medium 530.

The client device 500 may also comprise or may execute a variety of operating systems 541, comprising an operating system, such as a Windows™ or Linux™, or a mobile operating system, such as iOS™, Android™, or Windows Mobile™. The client device 500 may comprise or may execute a variety of possible applications 542, such as an electronic game 545. An application 542 may enable communication with other devices via a network, such as communicating with another computer or server via a network.

Further, the client device 500 may comprise one or more non-transitory processor-readable storage media 530 and one or more processors 522 in communication with the non-transitory processor-readable storage media 530. For example, the non-transitory processor-readable storage media 530 may be a RAM memory, flash memory, ROM memory, EPROM memory, EEPROM memory, registers, hard disk, a removable disk, a CD-ROM, or any other form of non-transitory storage medium known in the art. The one or more non-transitory processor-readable storage media 530 may store sets of instructions, or units and/or modules that comprise the sets of instructions, for conducting operations and/or method steps described in the present disclosure. Alternatively, the units and/or modules may be hardware disposed in the client device 500 configured to conduct operations and/or method steps described in the present disclosure. The one or more processors may be configured to execute the sets of instructions and perform the operations in example embodiments of the present disclosure.

Merely for illustration, only one processor will be described in client devices that execute operations and/or method steps in the following example embodiments. However, it should be note that the client devices in the present disclosure may also comprise multiple processors, thus operations and/or method steps that are performed by one processor as described in the present disclosure may also be jointly or separately performed by the multiple processors. For example, if in the present disclosure a processor of a client device executes both step A and step B, it should be understood that step A and step B may also be performed by two different processors jointly or separately in the client device (e.g., the first processor executes step A and the second processor executes step B, or the first and second processors jointly execute steps A and B).

Figure 6:
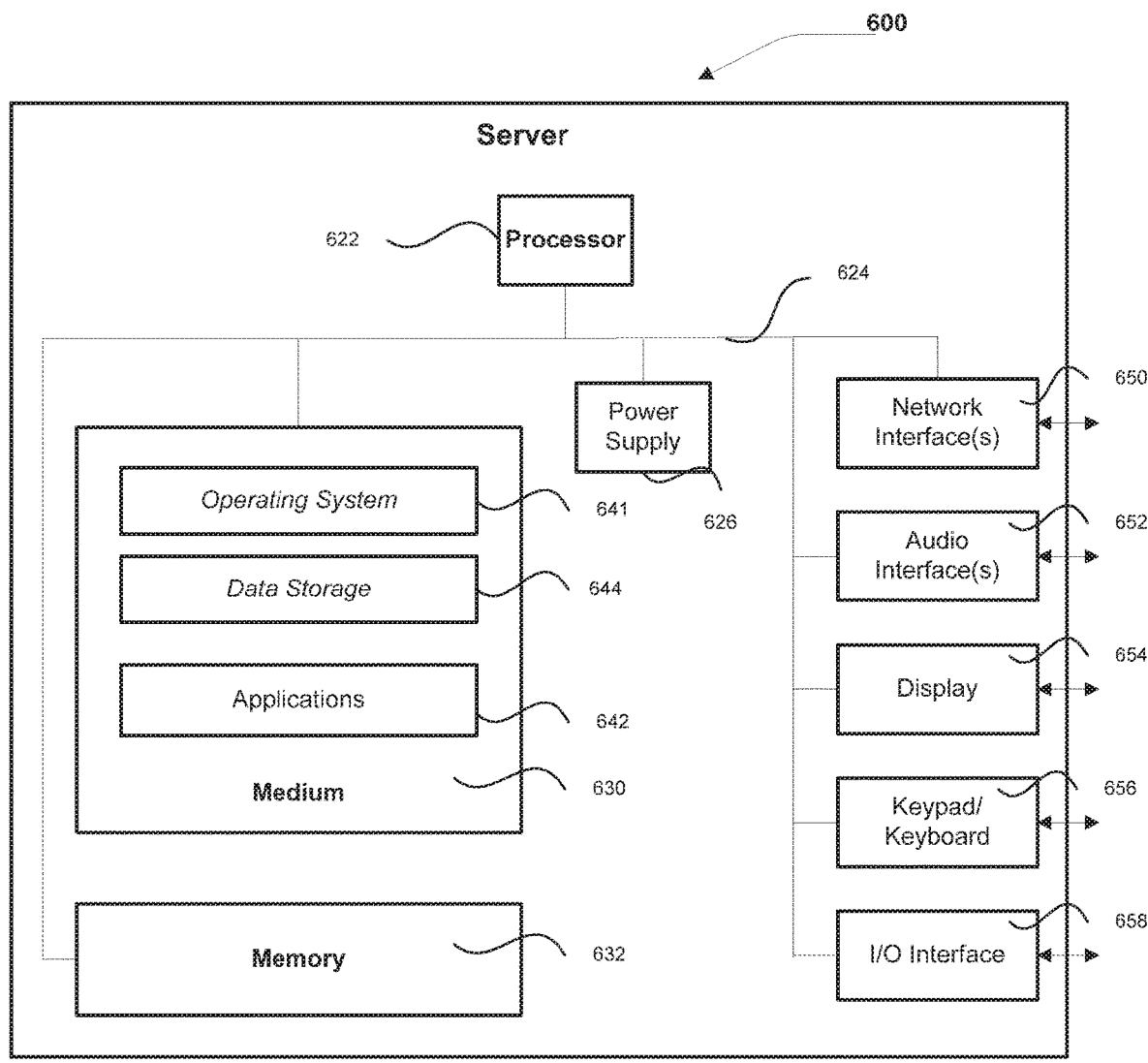
FIG. 6 is a schematic diagram illustrating an example embodiment of a server.

FIG. 6 is a schematic diagram illustrating an example embodiment of a server. The server 600 may be a public account server and/or an instant messaging server. The server 600 may be configured to connect to the client device 500 or another server locally or via a network. A Server 600 may vary widely in configuration or capabilities, but it may comprise one or more central processing units 622 and memory 632, one or more medium 630 (such as one or more mass storage devices) storing application programs 642 or data 644, one or more power supplies 626, one or more wired or wireless network interfaces 650, one or more input/output interfaces 658, and/or one or more operating systems 641, such as Windows Server™, Mac OS X™, Unix™, Linux™, FreeBSD™, or the like. Thus a server 600 may comprise, as examples, dedicated rack-mounted servers, desktop computers, laptop computers, set top boxes, mobile computational devices such as smart phones, integrated devices combining various features, such as two or more features of the foregoing devices, or the like.

The server 600 may serve as a search server 106 or a content server 107. A content server 107 may comprise a device that comprises a configuration to provide content via a network to another device. A content server may, for example, host a site, such as a social networking site, examples of which may comprise, but are not limited to, Flicker™, Twitter™, Facebook™, LinkedIn™, or a personal user site (such as a blog, vlog, online dating site, etc.). A content server 107 may also host a variety of other sites, comprising, but not limited to business sites, educational sites, dictionary sites, encyclopedia sites, wikis, financial sites, government sites, etc. A content server 107 may further provide a variety of services that comprise, but are not limited to, web services, third party services, audio services, video services, email services, instant messaging (IM) services, SMS services, MMS services, FTP services, voice over IP (VOIP) services, calendaring services, photo services, or the like. Examples of content may comprise text, images, audio, video, or the like, which may be processed in the form of physical signals, such as electrical signals, for example, or may be stored in memory, as physical states, for example. Examples of devices that may operate as a content server comprise desktop computers, multiprocessor systems, microprocessor type or programmable consumer electronics, etc.

FIG. 1 is a flow diagram illustrating a network interaction method described from the side of an instant messaging server, according to example embodiments of the present disclosure. The instant messaging server may have a structure as shown in FIG. 6. The information interaction method may include the following steps.

S101: The instant messaging server may receive an information operation request to a public account server, which may be sent from a terminal.

The terminal may be a client device shown in FIG. 5 and the public account server may be a server shown in FIG. 6. The information operation request to the public account server may be input and sent by a user after the user logged in his/her account to the instant messaging server from the terminal.

According to the example embodiments of the present disclosure, the abovementioned information operation request may be an information subscribing request or an information unsubscribing request input and sent by the user.

According to the embodiments of the present disclosure, after the user has used the account information (e.g., the user ID and password, wherein the user ID may be the account number or account name) to log into the instant messaging server through the terminal, the user may access a menu of topics in the public account that the user follows (i.e., a "follow" menu) on a "follow" interface of a public account, through which the user may be able to send the information operation request (e.g., the subscription request), by clicking a "follow" button or a "follow" icon, from a public account server to the terminal. The terminal then may transmit and/or send the information operation request, which is directed towards the public account server, to the instant messaging server.

In the example embodiments of the present disclosure, the terminal may include intelligent mobile phones (Android mobile phone, iOS mobile phone, etc.), tablet PCs and any other Mobile Internet Devices (MID) that a person of ordinary skill in the art may know at the time of filing of the present disclosure.

S102: After receiving the information operation request, the instant messaging server may respond to the information operation request, transmit and/or send a notification message of the information operation to the public account server. The public account server may then respond to the notification message of the information operation and develop and/or determine a corresponding information transmission strategy.

In one example embodiment, the instant messaging server in the abovementioned step S102 may respond to the information operation request to the public account server and transmit and/or send the notification message of the information operation to the public account server in the following way:

The instant messaging server may respond to the information operation request to the public account server by detecting whether the instant messaging server has received an instruction message from the public account server, instructing the instant messaging server to send the notification message of the information operation. If the instant messaging server has received the instruction message from the public account server, the instant messaging server may transmit and/or send the notification message of the information operation to the public account server; if the instruction message has not yet been received, the instant messaging server may wait until it receives the instruction message and then transmit and/or send the notification message of the information operation to the public account server. Accordingly, the instant messaging server may transmit and/or send the notification message of the information operation to the public account server after being so instructed so as to avoid blindly transmit and/or send the notification message of the information operation to the public account server, causing an increase in the load pressure on the public account server.

Alternatively, the instant messaging server in the abovementioned step S102 may respond to the information operation request to the public account server and transmit and/or send the notification message of the information operation to the public account server in the following way:

The instant messaging server responds to the information operation request to the public account server by detecting whether a preset time for transmitting and/or sending the notification message of the information operation has been reached. The instant messaging server may transmit and/or send the notification message of the information operation to the public account server if the preset time has been reached; if the preset time has not been reached, the instant messaging server may wait until the preset time is reached and then transmit and/or send the notification message of the information operation to the public account server. Further, when the preset time for transmitting and/or sending the notification message of the information operation has been reached, the instant messaging server may transmit and/or send a plurality of notification messages of information operation from various terminals together to the public account server. Each of the plurality of notification messages may indicate that a user has subscribed or unsubscribed news, instruction, and/or information from the public account server. Accordingly, the instant messaging server may not need to transmit and/or send a notification message to the public account server ever time when it receives an individual information operation request from a terminal. The instant messaging server may only need to transmit and/or send the plurality of notification messages together when the preset time for transmitting and/or sending the notification messages is reached so as to reduce the frequency at which the instant messaging server transmits and/or sends the plurality of notification messages of information operation and lower the load pressure on the instant messaging server.

S103: The instant messaging server may respond to the information operation request to the public account server and transmit and/or send the response to the terminal.

After the terminal has received the response from the instant messaging server, the terminal may output the response by showing a text message and/or an audio message on the public account "follow" interface.

The example embodiments of the present disclosure do not limit the order that step S102 and step S103 are executed.

Figure 7:
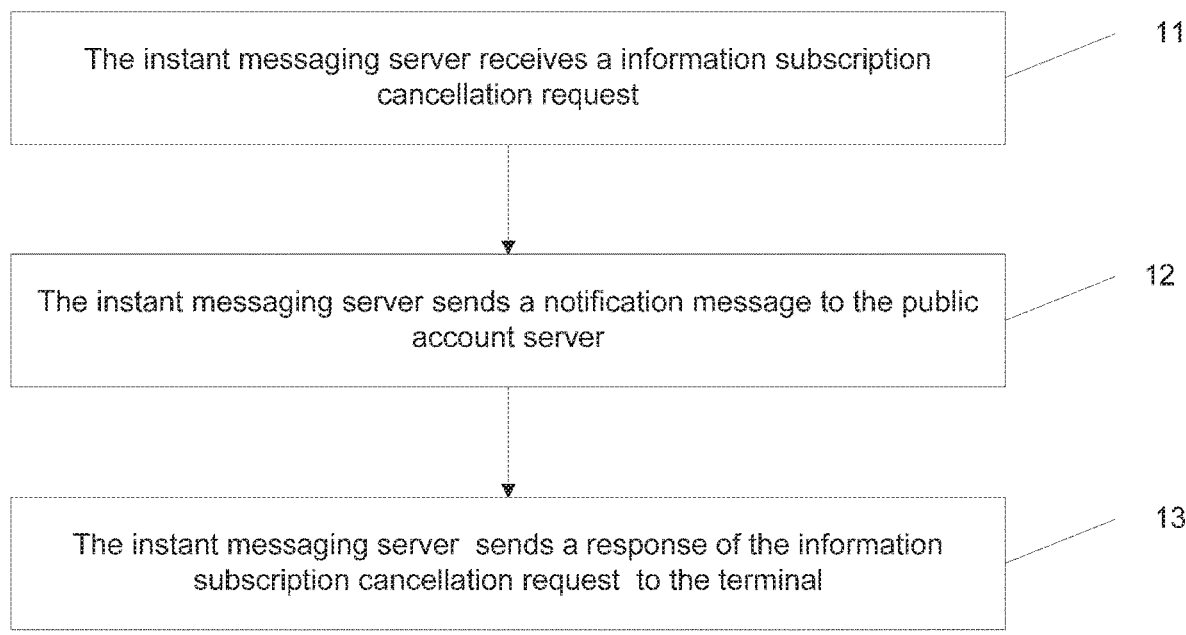
FIG. 7 is a flow diagram illustrating a network interaction method according to example embodiments of the present disclosure.

FIG. 7 is a flow diagram further illustrating steps of the network interaction method, taking that the information operation request is to unsubscribe news and/or from the public account server as an example, the steps may include:

11): The instant messaging server may receive an information unsubscribing request from a terminal to the public account server, wherein this information unsubscribing request to the public account server may be the information unsubscribing request input and sent by the user after the user has used the account information at the terminal to log into the instant messaging server.

12): The instant messaging server may respond to the information unsubscribing request to the public account server by transmitting and/or sending an information unsubscribing notification message to the public account server. The public account server may respond to the information unsubscribing notification message and update a corresponding information transmission strategy. For example, the public account server may respond to the information unsubscribing notification message and reduce the frequency of the information transmission or stops the information transmission.

13): The instant messaging server may respond to the information unsubscribing request to the public account server and transmit and/or send the response to the terminal.

Through the abovementioned steps 11)-13), the public account server may update the corresponding information transmission strategy after having learned that the subscription from the terminal has been canceled, so that the public account server may stop from transmitting and/or sending the information to the instant messaging server, so as to effectively reduce the waste of the resources of the public account server.

In the example embodiments of the present disclosure, the notification message of the information operation may further carry the user's account information. The user's account information may include the user ID, and the corresponding information transmission strategy developed and/or determined by the public account server may be an information transmission strategy specifically designed for this user ID.

For example, when the information operation request is an information subscription request, the information transmission strategy for this user ID may include periodically transmitting and/or sending specific news and/or to this user ID only, i.e., the public account server may transmit and/or send the specific news and/or for this user ID to the instant messaging server, and then the instant messaging server may transmit and/or send this specific news and/or to the user to whom the account information including this user ID belongs. Accordingly, the instant messaging server and the public account server may conduct individualized news and/or transmission to specific users.

In the network interaction method illustrated in FIG. 1, after the instant messaging server has received the information operation request, which is transmitted and/or sent by the terminal and targeted towards the public account server, the instant messaging server may respond to this information operation request to the public account server, transmit and/or send the notification message of the information operation to the public account server, and make and/or render the public account server to respond to the notification message of the information operation and develop and/or determine the corresponding information transmission strategy. Consequently, the public account server may develop and/or determine the corresponding information transmission strategy after having learned that a user has subscribed news, instruction, and/or information from it. This may prevent the public account server from transmitting and/or sending the news, instruction, and/or information to the instant messaging server in case that it has not been subscribed, thereby may effectively reduce the waste of the resources of the public account server.

Figure 2:
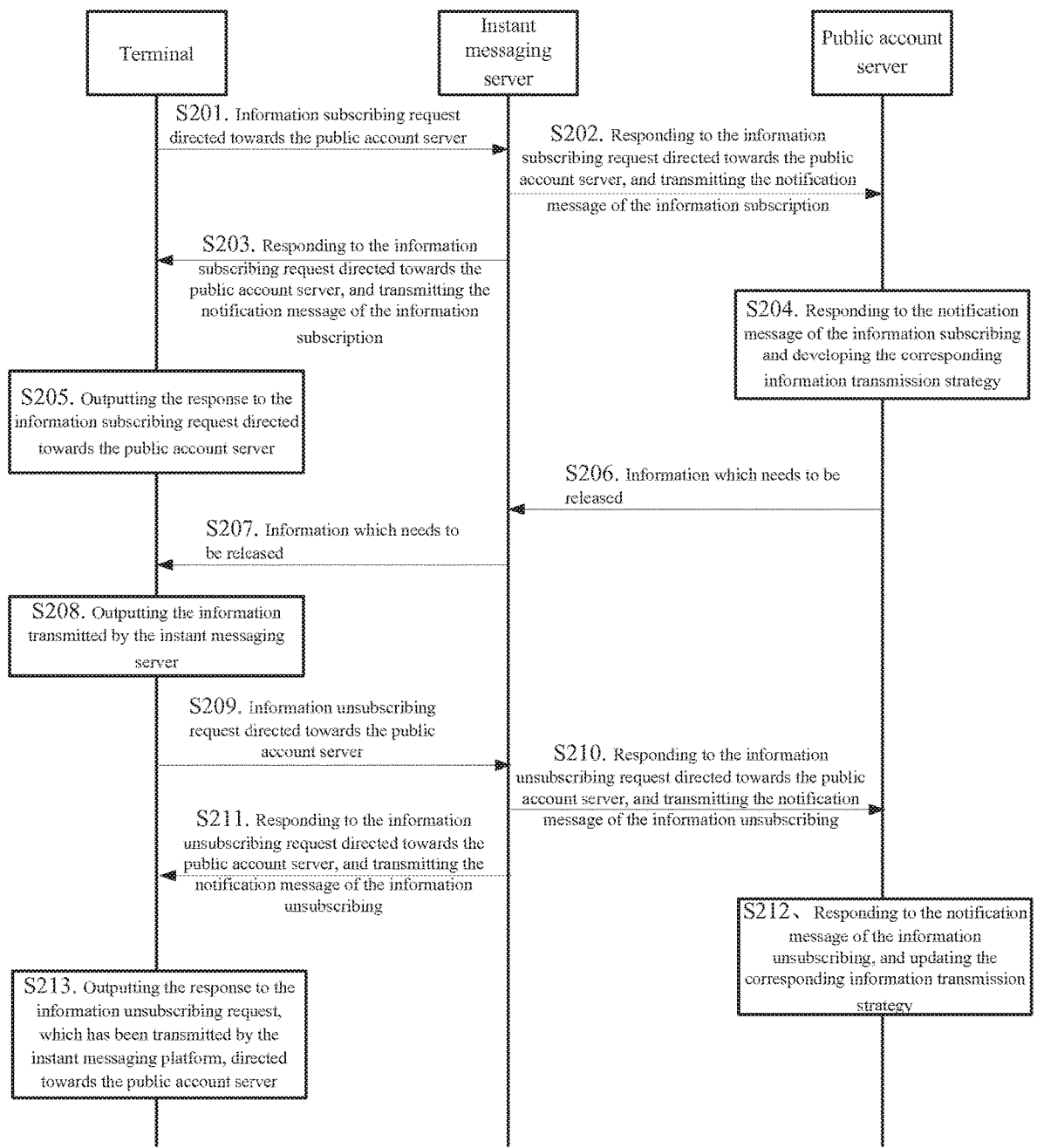
FIG. 2 is a flow diagram illustrating another network interaction method according to the example embodiments of the present disclosure.

FIG. 2 is a flow diagram illustrating another network interaction method according to the example embodiments of the present disclosure. The information interaction method may include the following steps:

S201: The terminal may transmit and/or send the information subscribing request targeted to the public account server to the instant messaging server, wherein the information subscribing request to the public account server may be an information subscribing request input and sent by the user of the terminal, after the user has used his/her account information at the terminal to log into the instant messaging server.

S202: After receiving the information subscribing request from the terminal, the instant messaging server may respond to the information subscribing request to the public account server and transmit and/or send the notification message of the information subscription to the public account server.

In one example embodiment, the instant messaging server may respond to the information subscribing request that is targeted to the public account server by detecting whether the instant messaging server has received from the public account server an instruction message configured to instruct it to send a subscription notification. The instant messaging server may transmit and/or send the notification message of the subscription to the public account server if the instruction message has been received; if the instruction message has not been received, the instant messaging server may wait until receiving the instruction message and then transmit and/or send the notification message of the subscription to the public account server. This way, the instant messaging server may transmit and/or send the notification message of the subscription to the public account server only when it is so instructed, avoiding from blindly sending the notification message of the subscription to the public account server and reducing the load pressure on the public account server.

In another example embodiment, the instant messaging server may respond to the subscription request to the public account server, detect whether a preset time for transmitting and/or sending the notification message of the subscription has been reached. The instant messaging server may transmit and/or send the notification message of the subscription to the public account server if the preset time has been reached; if the preset time has not been reached, the instant messaging server may wait until the preset time is reached and then transmit and/or send the notification message of the subscription to the public account server. Further, when the preset time for transmitting and/or sending the notification message of the subscription has been reached, the instant messaging server may transmit and/or send a plurality of notification messages of the subscription together to the public account server, wherein each of the plurality of notification messages of the subscription may correspond to a subscribing action to the public account server form a user. Accordingly, the instant messaging server may not need to transmit and/or send the notification message of the subscription to the public account server each time after receiving a subscription request to the public account server. The instant messaging server may transmit and/or send the plurality of notification messages together when the preset time for transmitting and/or sending the notification messages of the subscription has been reached, thereby reducing the frequency at which the instant messaging server transmit and/or send the notification messages of the subscription and lowering the load pressure on the instant messaging server.

S203: After the instant messaging server has received the information subscribing request to the public account server from the terminal, the instant messaging server may respond to the information subscribing request to the public account server and transmit and/or send the response to the information subscribing request to the public account server to the terminal.

According to the example embodiments of the present disclosure, there is no specific limitation to the execution order of step S202 and step S203.

S204: The public account server may respond to the notification message of the information subscription and develops and/or determines the corresponding information transmission strategy.

The development and/or determination of the corresponding information transmission strategy may include periodically transmitting and/or sending news, instruction, and/or information in a predetermined format from the public account server to the instant messaging server, for example, transmitting and/or sending the news, instruction, and/or information every four hours in a day, every day, or every week. The transmission strategy may also include transmitting and/or sending the news, instruction, and/or information according to a few preset fixed times. For example, the public account server may transmit and/or send the news, instruction, and/or information respectively at fixed times, such as 8:00 a.m., 12:00 p.m. and 6:00 p.m., every day. Alternatively, the public account server may transmit and/or send the subscribed news, instruction, and/or information sporadically or at variable time intervals.

S205: The terminal may receive the response to the information subscribing request to the public account server transmitted by and/or sent from the instant messaging server, and then may output the response.

According to the example embodiments of the present disclosure, there is no limitation as to the execution order of step S204 and step S205.

S206: The public account server may transmit and/or send the news, instruction, and/or information, which needs to be released, to the instant messaging server.

S207: The instant messaging server may transmit and/or send the news, instruction, and/or information, which has been transmitted and/or sent by the public account server, to the terminal.

S208: The terminal may receive the information from the instant messaging server and output and/or display the news, instruction, and/or information to the user.

S209: The terminal may transmit and/or send to the instant messaging server the information unsubscribing request to the public account server, wherein the information unsubscribing request to the public account server may be an information unsubscribing request input and sent by the user from the terminal after the user has used the account information at the terminal to log into the instant messaging server.

S210: After the instant messaging server receives the information unsubscribing request from the terminal, the instant messaging server may respond to the information unsubscribing request to the public account server and transmit and/or send the information unsubscribing notification message to the public account server.

S211: The public account server may receive the information unsubscribing notification message from the instant messaging server, and then respond to the information unsubscribing notification message and updates the corresponding information transmission strategy.

To this end, the public account server may respond to the information unsubscribing notification message and reduce the frequency of the information transmission or stops the information transmission.

S212: After the instant messaging server receives the information unsubscribing request to the public account server from the terminal, the instant messaging server may respond to the information unsubscribing request to the public account server and transmit and/or send the response to the information unsubscribing request to the public account server to the terminal.

S213: The terminal may receive the response to the information unsubscribing request to the public account server from the instant messaging server, and then may output and/or display the response.

According to the example embodiments of the present disclosure illustrated in FIG. 2, the public account server may develop and/or determine the corresponding information transmission strategy only after receiving the information subscribing request to prevent from transmitting and/or sending the news, instruction, and/or information to the instant messaging server without subscription, thereby effectively reducing the waste of the resources of the public account server. Furthermore, through the implementation of the network interaction method illustrated in FIG. 2, the public account server may also update the corresponding information transmission strategy only after receiving the information unsubscribing notification message, thereby preventing from transmitting and/or sending the news, instruction, and/or information to the instant messaging server in case that the subscription to it has been canceled, thus effectively reduce the waste of the resources of the public account server.

Figure 3:
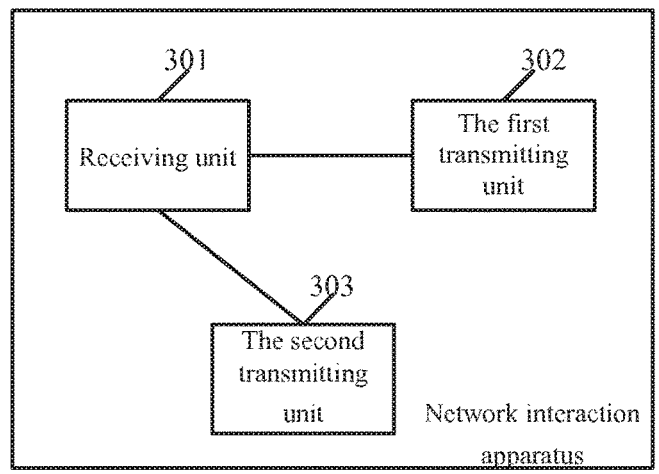
FIG. 3 is a structural diagram illustrating a network interaction apparatus according to the example embodiments of the present disclosure.

FIG. 3 illustrates a structural diagram of a network interaction apparatus according to the example embodiments of the present disclosure. The network interaction apparatus as shown in FIG. 3 may be an instant messaging server used as an independent device, or it may also serve as a newly added part of the instant messaging server. The network interaction apparatus may be configured to implement the network interaction method illustrated in the example embodiments of the present disclosure.

As shown in FIG. 3, the network interaction apparatus may include a receiving unit 301 configured to receive the information operation request, which has been transmitted and/or sent by the terminal, to the public account server; a first transmitting unit 302 configured to respond to the information operation request to the public account server, to transmit and/or send a notification message of the information operation to the public account server and to make and/or render the public account server respond to the notification message of the information operation and develop and/or determine a corresponding information transmission strategy; and a second transmitting unit 303 configured to respond to the information operation request to the public account server and to transmit and/or send the response to the information operation request to the public account server to the terminal.

According to the example embodiments of the present disclosure, the abovementioned information operation request may be an information subscribing request or may be an information unsubscribing request, which has been input and sent by the user into the terminal, after the user has used the account information at the terminal to log into the instant messaging server.

In one embodiment, the abovementioned first transmitting unit may 302 respond to the information operation request to the public account server and transmit and/or send the notification message of the information operation to the public account server through the following way:

The first transmitting unit 302 may be configured to respond to the information operation request to the public account server, to detect whether an instruction message sent by the public account server has been received. The instruction message may be configured to instruct the network interaction apparatus to send the notification of the information operation to the public account server. The first transmitting unit 302 may transmit and/or send the notification of the information operation to the public account server if the instruction message has been received; if the instruction message has not been received, then the instant messaging server may wait until it receive the instruction from the public account server and then transmit and/or send the notification of the information operation to the public account server. This way, the instant messaging server may transmit and/or send the notification message of the information operation to the public account server after the public account server has instructed it to do so, so that the notification message of the information operation may be prevented from being blindly transmitted and/or sent to the public account server.

According to another example embodiment, the first transmitting unit 302 may respond to the information operation request to the public account server and transmit and/or send the notification message of the information operation to the public account server by the following way:

The first transmitting unit 302 may be configured to respond to the information operation request to the public account server by detecting whether a preset time for transmitting and/or sending the notification message of the information operation has been reached. The instant messaging server may transmit and/or send the notification message of the information operation to the public account server if the preset time has been reached; if the preset time has not been reached, the instant messaging server may wait until the preset time has been reached and then transmit and/or send the notification message of the information operation to the public account server. When the preset time for transmitting and/or sending the notification message of the information operation has been reached, the first transmitting unit 302 may transmit and/or send a plurality of notification messages of the information operation together to the public account server, wherein each of the plurality of notification messages of the information operation represents a subscription or cancellation of subscription of the news, instruction, and/or information of the public account server from a user. Through this way, the instant messaging server may not need to transmit and/or send the notification message of the information operation to the public account server every time after receiving an individual information operation request to the public account server. The instant messaging server may only need to transmit and/or send the plurality of notification messages together when the preset time for transmitting and/or sending the notification messages of the information operation has been reached so as to reduce the frequency at which the instant messaging server transmits and/or sends notification messages to the public account server and lower the load pressure on the instant messaging server.

According to example embodiments of the present disclosure, the receiving unit 301 may be configured to receive the information unsubscribing request to the public account server from the terminal, wherein the information unsubscribing request to the public account server may be an information unsubscribing request input and sent by the user from the terminal, after the user has used the account information at the terminal to log into the instant messaging server.

Accordingly, the first transmitting unit 302 may be further configured to respond to the unsubscribing request to the public account server by transmitting and/or sending the unsubscribing notification message to the public account server and rendering the public account server to respond to the unsubscribing notification message and update the corresponding information transmission strategy.

To respond to the unsubscribing notification message and update the corresponding information transmission strategy, the actions the public account server conducts may include the step that the public account server responds to the information unsubscribing notification message and reduces the frequency of the information transmission or stops the information transmission.

Accordingly, the second transmitting unit 303 may be further configured to respond to the unsubscribing request to the public account server and transmit and/or send the response to the unsubscribing request to the public account server to a terminal.

In the embodiments of the present disclosure, the notification message, which has been transmitted and/or sent by the instant messaging server, of the subscription may carry the user ID included in the user's account information, and then the corresponding information transmission strategy may be an information transmission strategy specifically applied to the user ID. For example, the information transmission strategy to the user ID, which has been developed and/or determined by the public account server, may include transmitting and/or sending the news, instruction, and/or information, which the terminal subscribes is only to this user ID, in a periodic manner, i.e., the public account server may transmit and/or send the news, instruction, and/or information for this user ID to the instant messaging server, and the instant messaging server transmit and/or send the news, instruction, and/or information for this user ID only to the user corresponding to the user ID. Accordingly, the instant messaging server and the public account server may conduct individualized news, instruction, and/or information transmission to the user.

Through the implementation of the network interaction apparatus illustrated in FIG. 3, the public account server may develop and/or determine the corresponding information transmission strategy after learning that news, instruction, and/or information from it has been subscribed so that the public account server may avoid transmitting and/or sending the news, instruction, and/or information to the instant messaging server in case that they are not subscribed, causing waste of the resources of the public account server. Furthermore, through the implementation of the network interaction apparatus illustrated in FIG. 3, the public account server may also update the corresponding information transmission strategy after learning that a subscription of news, instruction, and/or information has been canceled, so that the public account server may avoid transmitting and/or sending the news, instruction, and/or information to the instant messaging server in case that the subscription has been canceled, causing the waste of the resources of the public account server.

Figure 4:
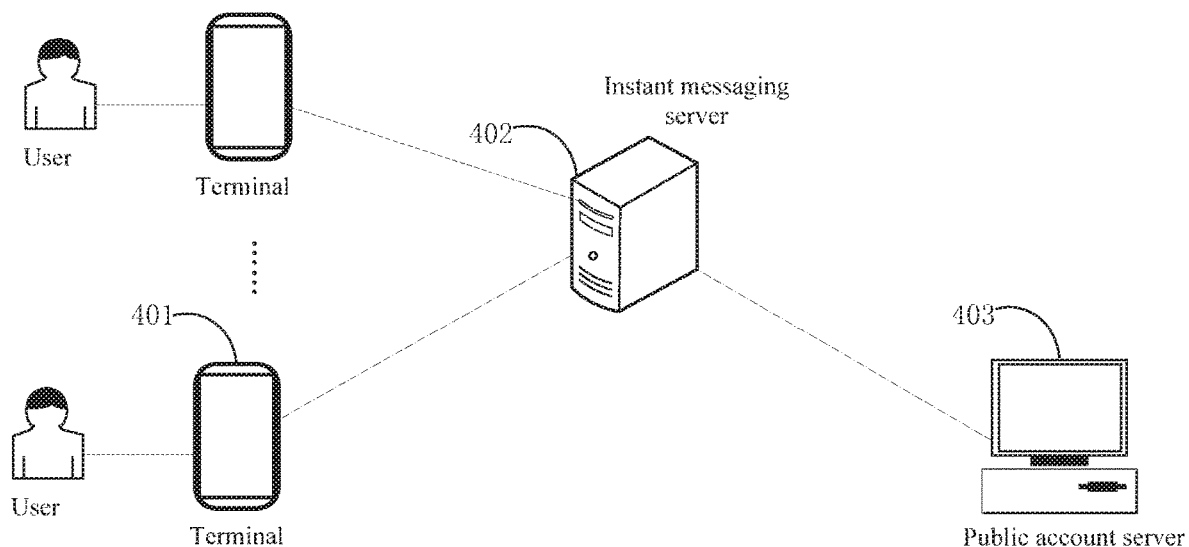
FIG. 4 is a structural diagram illustrating a network interaction system according to the example embodiments of the present disclosure.

FIG. 4 is a structural diagram illustrating a network interaction system according to the example embodiments of the present disclosure. The network interaction system may comprise a terminal 401, an instant messaging server 402, and a public account server 403.

The terminal 401 may be configured to transmit and/or send the information operation request to the public account server 403 to the instant messaging server 402.

The instant messaging server 402 may be configured to receive the information operation request, which has been transmitted and/or sent by the terminal 401, to the public account server 403, respond to the information operation request to the public account server 403, and transmit and/or send the notification message of the information operation to the public account server 403; the instant messaging server 420 may also respond to the information operation request to the public account server 403 and transmit and/or send the response to the information operation request to the public account server 403 to the terminal 401.

The public account server 403 may be configured to respond to the notification message of the information operation and develop and/or determine the corresponding information transmission strategy.

The terminal 401 may be further configured to receive the response to the information operation request, which has been transmitted and/or sent by the instant messaging server 402, to the public account server 403.

According to the example embodiments of the present disclosure, the abovementioned information operation request may be an information subscribing request or unsubscribing request, which may be input and sent by the user from the terminal 401, after the user has used the account information at the terminal 401 to log into the instant messaging server 402.

According to an example embodiment of the present disclosure, the instant messaging server 402 may respond to the information operation request to the public account server 403 and transmit and/or send the notification message of the information operation to the public account server 403 by the following way:

The instant messaging server 402 may be configured to respond to the information operation request to the public account server 403 by detecting whether the instruction message has been received. The instruction message may be sent by the public account server 403 and configured to instruct the instant messaging server 402 to send the notification of the information operation to the public account server 403. If the instruction message has been received, the instant messaging server 402 may transmit and/or send the notification message of the information operation to the public account server 403.

according to another example embodiment, the instant messaging server 402 may respond to the information operation request to the public account server 403 and transmit and/or send the notification message of the information operation to the public account server 403 by the following way:

The instant messaging server 402 may be configured to respond to the information operation request to the public account server 403 by detecting whether the preset time for transmitting and/or sending the notification message of the information operation has been reached. The instant messaging server 402 may transmit and/or send the notification message of the information operation to the public account server 403 if the preset time has been reached.

According to an example embodiment, the terminal 401 may be configured to transmit and/or send the unsubscribing request to the public account server 403 via the instant messaging server 402, wherein the unsubscribing request to the public account server 403 may be input and sent by the user via the terminal 401 after the user has used the account information at the terminal 401 to log into the instant messaging server 402.

Accordingly, the instant messaging server 402 may be further configured to receive the unsubscribing request from the terminal 401, respond to the unsubscribing request to the public account server 403, and transmit and/or send the unsubscribing notification message to the public account server 403.

Accordingly, the public account server 403 may be further configured to receive the unsubscribing notification message from the instant messaging server 402, respond to the unsubscribing notification message, and update the corresponding information transmission strategy.

Accordingly, the instant messaging server 402 may be further configured to respond to the unsubscribing request to the public account server 403, and transmit and/or send the response to the unsubscribing request to the terminal 401.

Accordingly, the terminal 401 may be further configured to receive the response to the unsubscribing request from the instant messaging server 402.

According to an example embodiment, the subscription notification message, which has been transmitted and/or sent by the instant messaging server 402, may carry the user ID included in the user's account information, and the corresponding information transmission strategy may be the information transmission strategy specifically for the user ID.

Through the application of the network interaction system illustrated in FIG. 4, the public account server 403 may be made and or rendered to develop and/or determine the corresponding information transmission strategy after having learned that the news, instruction, and/or information from it has been subscribed so that the public account server may avoid transmitting and/or sending the news, instruction, and/or information to the instant messaging server 402 in case that the news, instruction, and/or information has not been subscribed, causing the waste of the resources of the public account server 403. Furthermore, through the application of the network interaction system illustrated in FIG. 4, the public account server 403 may also be made and/or rendered to update the corresponding information transmission strategy after having learned that the subscription has been canceled so that the public account server 403 may stop transmitting and/or sending the news, instruction, and/or information to the instant messaging server 402 in case that the subscription to it has been canceled, so as to effectively reduce the waste of the resources of the public account server 403.

Those of ordinary skill in the art may understand that all or part of the steps of the methods of the abovementioned embodiments may be completed through hardware and also be completed through the program which instructs related hardware; this program may be stored in a type of computer-readable storage medium, and the abovementioned storage medium may include: flash memory disk, read-only memory (ROM), random access memory (RAM), disk or compact disk, etc.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

The terminology used in the description of the invention herein is for the purpose of describing particular examples only and is not intended to be limiting of the invention. As used in the description of the invention and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

While example embodiments of the present disclosure relate to apparatus and methods for network interaction between a terminal, an instant messaging server, and a public account server, the apparatus and methods may also be applied to multiple terminals, instant messaging servers, and public account servers, or may also be applied to other applications. For example, in addition to mobile terminals, the methods and apparatus may also be applied to non-mobile devices such as a desk top computer, a computer device mounted on a movable vehicle, or any devices that may be operated by a user to browse internet contents, etc. The present disclosure intends to cover the broadest scope of systems and methods for content browsing, generation, and interaction.

Thus, example embodiments illustrated in FIGS. 1-7 serve only as examples to illustrate several ways of implementation of the present disclosure. They should not be construed as to limit the spirit and scope of the example embodiments of the present disclosure. It should be noted that those skilled in the art may still make various modifications or variations without departing from the spirit and scope of the example embodiments. Such modifications and variations shall fall within the protection scope of the example embodiments, as defined in attached claims.

The invention claimed is:

1. A method, comprising:
   providing, by a first server, a first service to a plurality of users each associated with one of a plurality of service accounts via a plurality of terminals of the plurality of users;
   receiving, by the first server when providing the first service, a plurality of configuration requests each from one of the plurality of terminals via the plurality of service accounts for configuring an information dissemination service provided by a second server;
   bundling, by the first server, multiple configuration requests among the plurality of configuration requests into a group of notification messages; and
   sending, by the first server, the group of notification messages to the second server together when a preset time for transmitting notification messages is reached,
   wherein the second server is configured to receive the group of notification messages, and provide the information dissemination service individualized to the plurality of users according to the configuration requests contained in the group of notification messages via the first service and the first server.

2. The method of claim 1, wherein the information dissemination service comprises a public account service.

3. The method of claim 1, wherein the plurality of configuration requests comprise a subscribing request or an unsubscribing request for the information dissemination service.

4. The method of claim 1, wherein the plurality of configuration requests comprise instructions to configure the second server to provide the information dissemination service individualized to the plurality of users by dissemination information to the first server periodically, sporadically, or at a fixed time.

5. The method of claim 1, wherein the plurality of configuration requests are generated by the plurality of users from the plurality of terminals after the plurality of users have logged into the plurality of service accounts.

6. The method of claim 1, wherein the plurality of service accounts with the first service are associated with a corresponding plurality of user login IDs corresponding to the plurality of users, and wherein the plurality of configuration requests comprise the corresponding plurality of user login IDs, and wherein the second server tracks the information dissemination service individualized to the plurality of users by the corresponding plurality of user login ID associated with the plurality of service accounts with the first service.

7. A method, comprising:
   providing, by a first server, a first service to a plurality of users each associated with one of a plurality of service accounts via a plurality of terminals of the plurality of users;
   receiving, by the first server when providing the first service, a plurality of configuration requests each from one of the plurality of terminals via the plurality of service accounts for configuring an information dissemination service provided by a second server; and
   sending, by the first server, notification messages containing the plurality of configuration requests to the second server together when a preset time for transmitting notification messages is reached,
   wherein the second server is configured to
   receive the notification messages;
   extract the plurality of configuration requests;
   track the configuration requests by the plurality of users; and
   provide the information dissemination service individualized to the plurality of users according to the plurality of configuration requests via the plurality of service accounts associated with the first service.

8. The method of claim 7, wherein the information dissemination service comprises a public account service.

9. The method of claim 7, wherein the plurality of configuration requests comprise a subscribing request or an unsubscribing request for the information dissemination service.

10. The method of claim 7, wherein the plurality of configuration requests comprise instructions to configure the second server to provide the information dissemination service individualized to the plurality of users by dissemination information to the first server periodically, sporadically, or at a fixed time.

11. The method of claim 7, wherein the plurality of configuration requests are generated by the plurality of users from the plurality of terminals after the plurality of users have logged into the plurality of service accounts.

12. The method of claim 7, wherein the plurality of service accounts with the first service are associated with a corresponding plurality of user login IDs corresponding to the plurality of users, and wherein the plurality of configuration requests comprise the corresponding plurality of user login IDs, and wherein the second server is configured to track the configuration requests by the corresponding plurality of user login ID.

13. A first server, comprising:
    a computer-readable non-transitory storage medium comprising a set of instructions; and
    a processor in communication with the computer-readable non-transitory storage medium, the processor when executing the set of instructions, is configured to:
      provide a first service to a plurality of users each associated with one of a plurality of service accounts via a plurality of terminals of the plurality of users;
      receive, when providing the first service, a plurality of configuration requests each from one of the plurality of terminals via the plurality of service accounts for configuring an information dissemination service provided by a second server;
      bundle multiple configuration requests among the plurality of configuration requests into a group of notification messages; and
      send the group of notification messages to the second server together when a preset time for transmitting notification messages is reached,
    wherein the second server is configured to receive the group of notification messages and provide the information dissemination service individualized to the plurality of users according to the configuration requests contained in the group of notification messages via the first service and the first server.

14. The first server of claim 13, wherein the plurality of configuration requests comprise a subscribing request or an unsubscribing request for the information dissemination service.

15. The first server of claim 13, wherein the plurality of configuration requests comprise instructions to configure the second server to provide the information dissemination service individualized to the plurality of users by dissemination information to the first server periodically, sporadically, or at a fixed time.

16. The first server of claim 13, wherein the plurality of configuration requests are generated by the plurality of users from the plurality of terminals after the plurality of users have logged into the plurality of service accounts.

17. The first server of claim 13, wherein the plurality of service accounts with the first service are associated with a corresponding plurality of user login IDs corresponding to the plurality of users, and wherein the plurality of configuration requests comprise the corresponding plurality of user login IDs, and wherein the second server tracks the information dissemination service individualized to the plurality of users by the corresponding plurality of user login ID associated with the plurality of service accounts with the first service.

* * * * *